United States Patent
Wang et al.

(10) Patent No.: US 6,512,043 B2
(45) Date of Patent: Jan. 28, 2003

(54) TWO-PART STRUCTURAL ADHESIVE HAVING LONG WORKING TIME

(75) Inventors: Xiaobin Wang, Andover, MA (US); Donald Gosiewski, Peabody, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/851,612

(22) Filed: May 8, 2001

(65) Prior Publication Data

US 2002/0007027 A1 Jan. 17, 2002

Related U.S. Application Data

(63) Continuation-in-part of application No. 09/568,079, filed on May 10, 2000.

(51) Int. Cl.[7] ................................................ C08K 3/00
(52) U.S. Cl. ..................................................... 524/560
(58) Field of Search ......................................... 524/560

(56) References Cited

U.S. PATENT DOCUMENTS 3,925,895 A * 12/1975 Kliment ........................ 32/15
5,169,902 A * 12/1992 Yagi ............................ 525/301
5,380,772 A * 1/1995 Hasegawa .................... 522/14
6,268,464 B1 * 7/2001 Keinanen ..................... 528/272

* cited by examiner

Primary Examiner—Edward J. Cain
(74) Attorney, Agent, or Firm—Pitney, Hardin, Kipp & Szuch LLP

(57) ABSTRACT

A two-part adhesive comprising acrylic and/or methacrylic monomers, and advantageously toughening agents, impact modifiers including graft co-polymer (core-shell and non core-shell) impact modifiers, carboxylic acids, reducing agents, inhibitors, retarding agents, initiators and chain transfer agents is provided. Particularly advantageous reducing agents include anilines, toluidines, substituted anilines and substituted toluidines. The adhesive composition in accordance with the invention can achieve working times of 40 to 80 minutes or longer at 95° F., exhibits superior low-sliding performance, is resistant to boiling even for larger beads, and is non-sagging. In addition the adhesive composition of this invention achieves superior characteristics of high bonding strength, high impact strength, high tensile strength and high elongation of the cured adhesive.

36 Claims, No Drawings

TWO-PART STRUCTURAL ADHESIVE HAVING LONG WORKING TIME

CROSS REFERENCE TO RELATED APPLICATIONS

This application claims priority as a continuation-in-part of application Ser. No. 09/568,079, filed May 10, 2000, the contents of which are incorporated herein by reference.

BACKGROUND OF THE INVENTION

The invention relates generally to structural acrylic/methacrylic adhesives and more particularly to acrylic/methacrylic adhesives used for construction purposes or for the assembly of large objects.

Many products, ranging from car parts to boats to truck cabs and other structures are made by bonding various sheets (panels) of material, such as fiberglass, with adhesives. For example, U.S. Pat. Nos. 4,942,201 and 4,714,730, assigned to ITW of Glenview, Ill., the contents of which are incorporated herein by reference, describe adhesives made with methacrylate and acrylate based adhesives together with various other additives and ingredients for use in the construction of large objects.

Available adhesives have exhibited certain inadequacies in their potential application to various construction and manufacturing methods. For example, it is often desirable to apply the adhesive to a first surface of a substrate, for example a panel, and permit the adhesive to remain "open" and uncured for working times longer than one hour or more before the panel is assembled to another structure. "Working time" is thus the time where the adhesive compound can effectively be applied to one or more substrate. For example, during the construction of large boats, panels to be assembled could be 30 feet or longer and the bead, typically applied in a serpentine fashion, would be even longer. It is therefore necessary for the beginning of the bead to remain workable until it is time to assemble the panel, even if it takes a considerable amount of time to finish applying the bead and position the panel. This period of time, between the time when the adhesive is applied to a first substrate and when that first substrate can be pressed to a second substrate and positioned in place, to assemble the first substrate to the second substrate, will be referred to herein as "working time".

It is also desirable for adhesives to exhibit excellent cure properties, even when applied to cross sections well above 1/16 of an inch. For example, when large panels are fastened to structures with adhesive, the gap between the two members can vary in thickness. Gaps in a pair of adhered 20–50 foot panels can be 1 inch or more. Adhesives that are applied to this thickness generate considerable heat during curing. Adhesives with short cure times also can generate considerable heat. However, it is undesirable for the adhesive to generate so much heat that it boils during curing, because bubbles can form, thereby reducing structural integrity of the bonded assembly and composition.

It is also desirable for adhesives to cure over a wide range of temperatures, including cold temperatures below 65° F. and hot temperatures over 80 or 90° F., such as 95° F., that one might experience when building boats in southern Florida. Thus, it is desirable for adhesive to cure at cold temperatures, yet remain open for sufficiently long times at hot temperatures.

Available adhesives have exhibited other inadequacies. For example, many state of the art adhesives can "slide" down a vertical or inclined surface or in the case of overhanging overhead surfaces, fall off. This phenomenon is particularly troublesome on certain substrates, when a long working time is needed or when a large bead is run. This sliding phenomenon has interfered with the use of methacrylate and acrylate adhesives for structural bonding of large members in vertical or overhanging positions, particularly when adhering long objects and panels formed of glass fiber reinforced unsaturated polyester type materials. This can interfere with construction times and can in certain instances, and make the use of adhesives undesirable or impossible without complicating the manufacturing process or varying materials of construction.

Accordingly, it is desirable to provide a new adhesive which overcomes the drawbacks of the prior art.

SUMMARY OF THE INVENTION

Generally speaking, in accordance with the invention, a two-part adhesive comprising an adhesive part and an activator part is provided. The adhesive part comprises acrylic and/or methacrylic monomers, and advantageously further comprises toughening agents, impact modifiers including graft co-polymer (core-shell and non core-shell) impact modifiers, carboxylic acids, reducing agents, inhibitors, retarders and chain transfer agents. The activator part comprises initiators, a carrier and thickening agents. Advantageous reducing agent components include anilines, toluidines, substituted anilines and substituted toluidines. These reducing agents are particularly useful when used in conjunction with a peroxide initiator, such as a dibenzoyl peroxide initiator. Adhesives in accordance with the invention can achieve working times of 40 to 80 minutes or longer at 95° F.

Accordingly, it is an object of the invention to provide improved adhesives having advantageous properties and performance characteristics.

Other objects and advantages of the invention will in part be obvious and will in part be apparent from the specification.

The invention accordingly comprises the constructions, compositions and articles which possess the characteristics, properties and relations of elements, all as exemplified in the detailed disclosure hereinafter set forth.

DETAILED DESCRIPTION OF THE PREFERRED EMBODIMENTS

The invention is directed to structural adhesive compositions that can be used in various bonding applications, which have long working times, non-sag performance and acceptably low slide, so that they can be used to adhere large objects in an inclined, vertical or even overhead configuration. The invention is also directed to adhesive compositions which do not exhibit boil problems, even when relatively large beads of up to one inch or more in cross sectional diameter are applied.

The invention results in part from maintaining an advantageous balance between elastomeric polymer toughening agents and core-shell structured polymer impact modifiers to provide a combination of a high bonding strength, high impact strength, high tensile strength and high elongation of the cured adhesive, to develop an adhesive with selected advantageous physical characteristics. Consideration of the solvating power of the materials can lead to improved resistance to sagging and sliding. Selection of materials with due consideration of boiling points and the cure profile can resolve problems associated with boiling during curing.

It is believed that sliding results from the solvating properties of an adhesive with the substrate to which it is applied. This can be particularly problematic when the substrate is a polymer material, such as glass fiber reinforced unsaturated polyester. Thus, by identifying and reducing or eliminating ingredients with a high solvating power, anti-sliding performance can be improved.

Boiling problems can be addressed by identifying and reducing or eliminating the amount of ingredients with low boiling points and substituting ingredients with higher boiling points, while regulating the maximum heat generated during cure, through proper selection and proportion of ingredients. Preferred embodiments of the invention comprise acrylic or methacrylic monomers and one or more of the ingredients set forth below in Table 1.

Adhesives are advantageously provided in a two-part system, comprising what can be referred to as an adhesive part, portion or component and an activator part, portion or component. The two components are combined prior to application and should be formulated to promote relatively long working times. Otherwise, the adhesive will harden before the full bead is applied for the two parts to be adhered in proper contacting relationship and proper adhesion might not be achieved.

A preferred composition of the adhesive portion of a two-part adhesive in connection with preferred embodiments of the invention, is set forth below in Table 1.

TABLE 1

Composition of Adhesive Part

| Component | Range, % by wt. | | |
| --- | --- | --- | --- |
| | Acceptable | Preferred | Most Preferred |
| (Meth)Acrylate monomer(s) | 55–75 | 58–68 | 60–65 |
| Carboxylic acid(s) | 0–10 | 0.5–6 | 1–3 |
| Toughening agent(s) | 1–20 | 2–16 | 3–10 |
| Impact modifier(s) | 18–38 | 24–34 | 28–32 |
| Reducing agent(s) | 0.02–1 | 0.05–0.8 | 0.1–0.4 |
| Inhibitor(s)/Retarder(s) | 0.001–0.15 | 0.005–0.1 | 0.01–0.08 |
| Chain transfer agent(s) | 0–1 | 0.2–0.8 | 0.4–0.6 |

Preferred methacrylate and/or acrylate monomers useful in the present invention include the polymerizable methacrylate esters and acrylate esters with the following general structures and/or mixtures thereof:

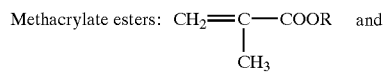

Methacrylate esters: $CH_2\!=\!C\!-\!COOR$ and
$\quad\quad\quad\quad\quad\quad\quad\quad\;\;|$
$\quad\quad\quad\quad\quad\quad\quad\quad CH_3$
Acrylate esters: $CH_2\!=\!CH\!-\!COOR$, $R = C_nH_{2n+1}$, $n = 1, 2, 3 \ldots 20$.

Preferred monomers are those in which $n \leq 2$, and preferably those in which n is 1, such as methyl methacrylate. Longer chain monomers in which $n>2$, preferably $n=10-18$, most preferably $n=12-16$ are advantageously incorporated to improve the anti-sliding performance of the adhesive and to reduce the shrinkage and the peak exotherm temperature, which is advantageous in avoiding boiling problems. These longer chain monomers are included at concentrations up to approximately 50% by weight of the adhesive part, preferably less than 10% by weight and most preferably less than 7%. If too much of these longer chain monomers are included, the cured adhesive can have unacceptable mechanical properties, poor adhesion to certain substrates and poor chemical resistance.

One or more strong carboxylic acid, particularly those described in U.S. Pat. Nos. 4,959,405 and 4,714,730, incorporated herein by reference, can be included to enhance bondability. An example of such an acid is methacrylic acid.

It has been determined that adding one or more carboxylic acid, particularly strong organic carboxylic acids, to acrylate and/or methacrylate based adhesive compositions in accordance with the invention can improve the bonding characteristics thereof. It is believed that the addition of a strong organic acid acts to promote adhesion to solvent-resistant and/or heat-resistant plastics, thermoplastics, resin/glass composites, resins and the like, due to interactions at the molecular level.

Toughening agents advantageously included in compositions used in the present invention include elastomeric polymers, particularly those that are soluable in methacrylate and/or acrylate monomers such as polychloroprene. Additional examples of these can be found in U.S. Pat. Nos. 5,112,691 and 4,942,201 incorporated herein by reference.

Adhesives in accordance with preferred embodiments of the invention are advantageously used, for example, in the construction of boats, wherein two large pieces of composite material are bonded together. As the boat travels through the water, it can be subjected to "pounding" by the waves and the bonded parts can flex differently. Thus, for this and other applications of adhesives in accordance with the invention, it can be advantageous that the cured adhesive have sufficient flexibility, or elasticity, which can be characterized as percent elongation, to permit some relative movement between the bonded surfaces. Thus, elastomers, polymers, impact modifiers and the like can impart advantageous elongation properties to the cured adhesive. Adhesives in accordance with embodiments of the invention can exhibit 50% and higher elongation after cure. Other embodiments of the invention require greater rigidity and may not benefit from the inclusion of these components.

Elastomers useful in this invention can advantageously have a second order glass transition temperature (Tg) of less than $-25°$ and are advantageously soluble in the monomers described herein. Useful elastomers can include synthetic high polymers which exhibit plastic flow. Preferred elastomers include those which are supplied commercially as adhesive or cement grades.

A preferred group of elastomers for use in certain applications of this invention are polychloroprene (neoprene) and copolymers of butadiene or isoprene with styrene, acrylonitrile, acrylate esters, methacrylate esters, and the like. Additional useful elastomers are copolymers of ethylene and acrylate esters, homopolymers of epichlorohydrin and copolymers of epichlorohydrin and ethylene.

Specific examples of useful polymers, using their letter designation according to ASTM D1418, their trade or common name and chemical description are: CR-Neoprene-polychloroprene; NBR-Nitrile rubber-butadiene acrylonitrile copolymer containing about 25 to about 45 weight percent acrylonitrile; COX-Hycar 1072-butadiene-acrylonitrile copolymer modified with carboxylic groups; SBR-GR-S-styrene-butadiene copolymer containing about 10 to about 30 weight percent styrene; ABR-Acrylic rubber acrylate butadiene copolymer; and CO, ECO-Hydrin 100 and 200-homopolymer or a copolymer of epichlorohydrin and ethylene oxide. Additional useful elastomers are copolymers of ethylene and acrylate esters, such as methyl acrylate and ethyl acrylate, wherein the copolymer preferably comprises at least 30 weight percent acrylate ester, which elastomers are sold commercially by Dupont under the Vamac trademark.

Elastomers useful in this invention are described in detail in the "Handbook of Plastics and Elastomers" pages 1–106–119, (1975) McGraw-Hill, Inc., which is hereby incorporated by reference.

Particularly useful elastomers for certain embodiments of the invention are polychloroprene and block copolymers of styrene and butadiene or isoprene, such block copolymers being sold under the trademark Kraton by Shell Oil Company. Block copolymers of styrene and diene monomers are described in detail in U.S. Pat. Nos. 4,041,103 and 4,242,470 which are hereby incorporated by reference.

Impact modifiers useful in compositions in accordance with the invention include graft copolymers that can swell in methacrylate and/or acrylate monomers. Examples of those impact modifiers include PARALOID® BTA-753 from Rohm and Haas Company, KANE ACE B-564 from Kaneka Texas Corporation and Geloy 1020 from GE Plastics. U.S. Pat. Nos. 5,112,691 and 4,942,201 also disclose useful impact modifiers. The impact modifiers used in the present invention provide not only excellent impact strength but also non-sag, excellent thixotropic property and improved anti-sliding performance.

Graft copolymers useful in accordance with preferred embodiments of the invention include those disclosed in U.S. Pat. No. 4,536,546, the contents of which are incorporated herein by reference. Polymers comprising chains of at least two different monomers can be linked together in a "block" or "graft" arrangement When the backbone is a rubber or rubber-like material, the grafted sequences are usually vinyl, acrylate or methacrylate based monomers. Advantageous graft copolymers can provide the adhesive composition with enhanced physical properties. Preferred graft copolymers have a backbone polymer with a glass transition temperature substantially below ambient temperature and a grafted polymer resin having a glass transition temperature substantially above ambient temperature, with ambient temperature considered the temperature range within which the adhesive is to be used.

Core-shell graft copolymers useful in this invention preferably have a "rubbery" core, a "hard" shell, and swell in the monomer compositions but do not dissolve therein. The "core" or backbone polymer of the graft copolymers preferably has a glass transition temperature substantially below ambient temperatures. The "shell" polymer which is grafted onto the backbone polymer preferably has a glass transition temperature substantially above ambient temperatures. Ambient temperature is defined as the temperature range in which the adhesive is used.

Examples of useful core-shell graft copolymers are those where "hard" monomers, such as styrene, acrylonitrile or methyl methacrylate, are grafted onto a rubbery core made from polymers of "soft" or "elastomeric" monomers, such as butadiene or ethyl acrylate.

U.S. Pat. No. 3,985,703, which is hereby incorporated by reference, describes useful core-shell polymers, the cores of which are made preferably from butyl acrylate, but which can be based on ethyl, isobutyl, 2-ethylhexyl, or other alkyl acrylates or mixtures thereof. The core polymer, optionally, should contain no more than about 20 percent of other copolymerizable monomers, such as styrene, vinyl acetate, methyl methacrylate, butadiene, isoprene and the like. The core polymer optionally, should contain no more than about 5 percent of a crosslinking monomer having two or more nonconjugated double bonds of approximately equal reactivity, such as ethylene glycol diacrylate, butylene glycol dimethacrylate and the like. It also optionally should contain no more than about 5 percent of a graft-linking monomer having two or more nonconjugated double bonds of unequal reactivity, such as diallyl maleate and allyl methacrylate.

The shell stage is preferably polymerized from methyl methacrylate and optionally other lower alkyl methacrylates, such as ethyl, butyl, styrene, acrylonitrile, or mixtures thereof. No more than about 40 percent by weight of the shell monomers should be styrene, vinyl acetate, vinyl chloride, and the like.

Additionally useful core-shell graft copolymers are described in U.S. Pat. Nos. 3,984,497, 4,096,202, and 4,034,013, which are hereby incorporated by reference.

Still other useful core shell polymers are the "MBS" polymers such as those described in U.S. Pat. No. 4,304,709 which is hereby incorporated by reference. The MBS polymers are made by polymerizing methyl methacrylate in the presence of polybutadiene or a polybutadiene copolymer rubber.

Other patents which describe various useful core-shell graft copolymers are U.S. Pat. Nos. 3,944,631, 4,306,040 and 4,495,324, each of which is hereby incorporated by reference.

The preferred core-shell graft polymers used in this invention swell in size in the adhesive formulation but do not dissolve. The adhesives, so formulated, exhibit improved flexibility, spreading and flow properties which are highly desirable in many adhesive applications.

Selection of appropriate reducing agents can be particularly important in formulating the composition of the adhesive part of adhesive compositions in accordance with the invention. Reducing agents with initiators form part of the redox systems which dominate the curing profile and the working time of the adhesives. For example, in order to have 40 to 80 minutes working time at 95° F., the following derivatives of aniline, toluidine, and substituted aniline/toluidine are useful in the present invention. Dibenzoyl peroxide is preferably used as the initiator or major initiator. (Note that working times under 40 minutes or longer than 80 minutes can also be achieved). The reducing agents should be selected from Group 1 or Group 1 and Group 2. When the reducing agents are selected from both Group 1 and Group 2, the proportion of Group 2 reducing agent to total reducing agent is preferred to not exceed 30 mole percent.

Group 1

Anilines:

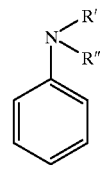

where R' and R" are —$CH_3$ or —$C_2H_5$. They may be same or different.

Toluidines:

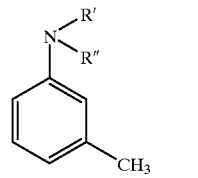 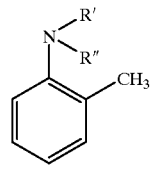

for ortho-toluidines, R' and R" are only —$CH_3$. For meta-toluidines, R' and R" are —$CH_3$, or $CH_2CHY_2$, where Y is H, a weak electron-releasing group or a strong electron-withdrawing group such as an alkyl group with $C_1$ to $C_6$, OH, CN, a halogen, $OC_nH_{2n+1}$ with n less than 4, $OOCCH_3$ or the like. R' and R" may be the same or different.

Substituted Anilines:

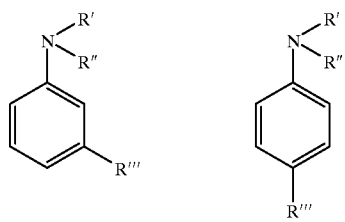

where R''' is any halogen but preferably not F, OR where R has $C_1$ to $C_6$, $COOC_nH_{2+1}$ with n up to 10 or the like. R' and R'' are the same as defined under anilines.

Substituted Toluidines:

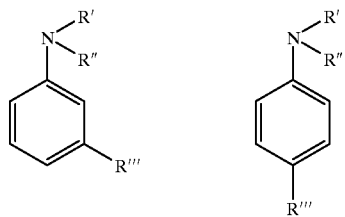

where R''' is CHZ'Z'' or $CH_2Z'$, where Z' and/or Z'' is an alkyl group with $C_1$ to $C_6$, a halogen, OH, OR where R has $C_1$ to $C_6$, $COOC_nH_{2n+1}$ with n up to 10, and the like. Z and Z' may be the same. R' and R'' are the same as defined under toluidines.

Group 2: The reductants in this group are those that are more efficient than the ones in Group 1.

Para-Toluidines

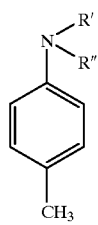

where R' and R'' are the same as defined under toluidines in Group 1.

Substituted Para-Toluidines:

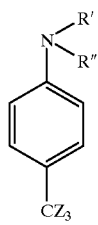

where R' and R'' are the same as defined under toluidines in Group 1. Z is either an electron-releasing group or an electron-withdrawing group with a molecular weight of preferably less than about 300, more preferably less than about 200, most preferably less than about 100. The three Zs may be the same or different.

Inhibitors/retraders can also be advantageously included to provide compositions having a reasonable shelf life and well defined curing profiles. These substances can act to suppress the polymerization of monomers by reacting with the initiating and propagating radicals and converting them either to non-radical species or radicals of reactivity too slow to undergo propagation. Common inhibitors and retarders can be found in "Principles of Polymerization" by George Odian, pp. 262–266, $3^{rd}$ edition, published by Wiley Interscience, incorporated by reference.

Other small ingredients such as chain transfer agents, pigments, fragrance and so on may be used in the composition as would be apparent to one skilled in the art.

The composition of the activator part of the two-part adhesive systems in accordance with the invention comprises at least one initiator, preferably initiators and carrier and most preferably initiators, carrier and thickening agent(s).

Typically, initiators employed in the present invention include peroxides, such as dibenzoyl peroxide. Dibenzoyl peroxide can be used as the sole initiator or as the major initiator. The less effective peroxides such as cumene hydroperoxide may be used as co-initiators in order to have more complete initial conversion. The co-initiators are normally not used as sole initiators. The mole ratio between co-initiators and major initiators should be less than 0.5, preferably less than 0.4, most preferably about 0.2 to 0.3.

These polymerization catalysts act by generating free radicals which trigger the polymerization of the acrylate and metahcrylate monomers. Additional catalysts include hydroperoxides, peresters, peracids, radiant or UV energy and heat. Examples of other such catalysts include cumene hydroperoxide, tertiary butyl hydroperoxide, dicumyl peroxide, tertiary butyl peroxide acetate, tertiary butyl perbonzoate, ditertiary butyl azodiisobutyronotrile, and the like.

The initiators are generally commercially available with a carrier in solid form or liquid form including solutions, suspensions, emulsions and pastes. The carrier should comprise ingredients that are inert to the initiators under normal storage conditions. Those ingredients can include water, plasticizers, surfactant and so on. Extra amounts of those ingredients can be added to adjust the concentration of the initiators in the activator part, or the viscosity and specific gravity of the activator part. The carrier should normally be less than 20% based on the total weight of the adhesive part and activator part, preferably less than 10%.

Thickening agents useful in the present invention are preferably inorganic or organic fillers, and/or inert polymers that can be dissolved, swollen or suspended in the carrier. They can be used to modify the viscosity, specific gravity and thixotropic properties of the activator part.

Other ingredients such as pigments may be added into the activator part. Whole or partial amounts of some ingredients, those which are inert to the initiators, such as some toughening agents, certain impact modifiers, inhibitors/retardents and chain transfer agents in adhesive side, may be moved to the activator part.

The adhesive part and activator part of this invention can be formulated to have any ratio between the two parts in a very broad range, but the mole ratio of the sole/major initiator(s) to the reducing agent(s) should be in the range of 2.2 to 10, preferably 3.3. to 5. One of the most practical ratios between the adhesive part and the activator part is 10:1 by volume.

The following examples are presented for purposes of illustration and should not be considered as limiting.

EXAMPLE 1

A composition of the Activator Part.

TABLE 2

A Composition of the Activator Part

| Ingredient | | % by wt. |
|---|---|---|
| Geloy 1020 Premix[a] | Geloy 1020 is a terpolymer of acrylic-styrene-acrylonitrile sold by GE Plastics. | 72.00 |
| Cadox BTW-55 | 55% BPO paste in plasticizer from Akzo Nobel Chemicals Inc. | 18.75 |
| HERCULES CHP | 85% cumene hydroperoxide sold by Hercules, Inc. | 2.50 |
| Santicizer 278 | Texanol benzyl phthalate from Solutia | 1.81 |
| Diisobutyl Phthalate | Sold by Unitex Chemical Corporation | 1.81 |
| ATOCHEM NDM | n-Dodecyl mercapton from Elf Atochem North America | 0.88 |
| Magnesium sulphate | Sold by Sigma-Alsrich | 2.00 |
| VC 31327 Blue | VC pigment dispersion from American Colors, Inc. | 0.25 |

[a]Geloy 1020 Premix comprises 15% of Geloy 1020, 42.5% of Santicizer 278 and 42.5% of diisobutyl phthalate.

This activator part will be used with the adhesive parts for the illustration.

EXAMPLE 2

A composition of the Adhesive Part.

TABLE 3

Composition of Adhesive Part

| Ingredient | | % by wt |
|---|---|---|
| Neoprene AD10 Premix[a] | Neoprene AD10 is chloroprene homopolymer with Tg of −40 to −45° F. from DuPont Dow Elastomers. | 19.40 |
| Na EDTA solution | 5% Na EDTA in 47.5% water and 47.5% ethylene glycol | 1.00 |
| Boler 1977 wax | fully refined paraffin wax with melting point of 142° F. from IGI Boler, Inc. | 0.75 |
| 1,4-NQ | 1,4-Napthoquinone from Aceto Corporation. | 0.05 |
| Emery ® 5709 | N,N-Bis(2-hydroxyethyl)-m-toluidine from Cognis Corporation. | 0.30 |
| MAA | Inhibited methacrylic acid from Rohm & Haas Company | 1.25 |
| MMA | Inhibited methyl methacrylate from Rohm & Haas Company | 47.25 |
| Paraloid BTA 753 | Methacrylate-butadiene-styrene copolymer, a core-shell structured impact modifier from Rohm & Haas Company. | 30.00 |

[a]The premix comprises 15.35% of Neoprene AD10, 0.02% of 1,4-NQ and 84.63% of MMA.

EXAMPLE 3

Properties of the two-part adhesive prepared from Examples 1 and 2 with a mix ratio of 10:1 by volume or 8.85:1 by weight.

TABLE 4

Properties of the Two-Part Adhesive

| Property | Result |
|---|---|
| Viscosity[a], cps | Activator part: about 50K at 25° C.; Adhesive part: 199K at 23° C. |
| Sag of mixture | None (up to a 3 in. bead) |
| Sliding of mixture on woven FRP[b] | None. |
| 30 g exotherm at RT[c] | 159 min. @ 225° F. |
| Working time at RT | Minimum: 79 min.; Maximum; 95 min. |
| Cure quality | Good, from very thin through approximately 1 inch sections |
| Hardness | 63–67 Shore D, overnight cure at room temp. |
| 30 g exotherm at 95° F. | 84 min. @ 188° F. |
| Working time at 95° F. | Minimum: 42 min.; Maximum: 50 min. |
| Tensile strength[d] | 2580 psi |
| Elongation at break[d] | 183% |
| Lap shear strength[e] | 1630 psi on 36 grit blasted stainless steel |

[a]Brookfield DV-II + Viscometer was used with spindle TB at 10 rpm.
[b]Bead size was 0.8" H x 1.8" W x 3.0" L.
[c]30 g exotherm sample is always run in 30 ml. disposable plastic beaker.
[d]The samples were cured for overnight at room temperature, ASTM D638.
[e]The samples were cured for overnight at room temperature, ASTM D1002.

EXAMPLE 4

The reducing agents in Group 2 normally are not used as sole or primary reducing agents. However, they can be utilized to minimize the boil problems and adjust the cure profile. Table 5 shows that N, N-bis(2-hydroxyethyl)-p-toluidine (Emery 5710 from Cognis Corporation) from Group 2 eliminated the boil problem. The mixture of reducing agents from both groups initiates the free radical polymerization in a wider range so that the heat build-up is reduced. The disadvantage of using more efficient reducing agents is that they shorten the working time significantly. (see Table 5, below).

EXAMPLE 5

Larger molecular weight monomers compared to MMA can not only minimize the boil problem but also improve the anti-sliding performance. Table 6 demonstrates that CD550 (methoxy polyethylene glycol (350) monomethacrylate from SARTOMER Company, Inc.) and Ageflex FM246 (mixture of $C_{12}$, $C_{14}$, $C_{16}$ methacrylates from Ciba Specialty Chemicals) minimized the boil problem that both formulas without CD550 and Ageflex FM246 have while maintaining similar other properties such as the cure profile and mechanical properties. Not only the 30 g exotherm sample did not boil but also the 180 g and one inch thick sample did not boil, either. Also, the formulas with the larger molecular weight monomers improved the anti-sliding performance on certain glass fiber reinforced unsaturated polyester substrates. (See Tables 6-1 and 6-2, below).

TABLE 5

Compositions of Adhesive Parts and Some of their Cure Properties

| | % by weight | | |
|---|---|---|---|
| Ingredient | Example 3-1 | Example 3-2 | Example 3-3 |
| AD10 Premix | 19.40 | 19.40 | 19.40 |
| NaEDTA solution | 1.00 | 1.00 | 1.00 |
| Boiler 1977 wax | 0.75 | 0.75 | 0.75 |
| Emery 5709 | 0.20 | 0.20 | 0.20 |
| Emery 5710 | 0 | 0 | 0.10 |
| 1,4-NQ | 0 | 0.05 | 0.05 |
| tert-Bytulcaticol | 0.01 | 0 | 0.005 |
| MAA | 1.25 | 1.25 | 1.25 |
| MMA | 50.64 | 50.60 | 50.595 |
| BTA 753 | 28.0 | 28.0 | 28.0 |
| 30 g exotherm at RT, min/° F.[a] | 154/282 | 174/243 | 132/217 |
| 30 g exotherm sample | Boiled | Boiled | Did not boil |

[a]An activator from Example 1 was used for the 30 g exotherm. The mix ratio between the adhesive part and activator part was 10:1 by volume

TABLE 6-1

Compositions of Adhesive Parts Containing CD550 and Ageflex FM246

| | % by weight | |
|---|---|---|
| Ingredient | Example 4-1 | Example 4-2 |
| AD10 Premix | 19.40 | 19.40 |
| NaEDTA solution | 1.00 | 1.00 |
| Boiler 1977 wax | 0.75 | 0.75 |
| Emery 5709 | 0.20 | — |
| Emery 5714 | — | 0.20 |
| 1,4-NQ | 0.50 | 0.50 |
| MAA | 1.25 | 1.25 |
| MMA | 36.90 | 36.90 |
| CD550 | 5.00 | 5.00 |

TABLE 6-1-continued

Compositions of Adhesive Parts Containing CD550 and Ageflex FM246

| | % by weight | |
|---|---|---|
| Ingredient | Example 4-1 | Example 4-2 |
| Ageflex 246 | 5.00 | 5.00 |
| BTA 753 | 30.00 | 30.00 |

TABLE 6-2

Properties of Adhesive Parts in Table 6-1 with Activator from Table 2

| Property | Example 4-1 | Example 4-2 |
|---|---|---|
| 30 g exotherm at RT, min/° F. | 176/203 | 168/189 |
| Working time at RT, min | | |
| Minimum | 89 | 86 |
| Maximum | 121 | 118 |
| 180 g exotherm at RT, min/° F.[a] | 154/258 | 134/234 |
| 30 g exotherm at 95° F., min/° F. | 107/219 | 101/201 |
| Working time at 95° F., min/° F. | | |
| Minimum | 49 | 47 |
| Maximum | 59 | 58 |
| Tensile strength, psi[b] | 2262 | 1953 |
| Elongation, %[b] | 216 | 211 |
| Lap shear strength, psi[b] | | |
| Grit blasted stainless steel[b] | 1549 | 1446 |
| Glass fiber reinforced unsaturated polyester[b,c] | 424 | 425 |
| Sliding of mixture on woven FRP[d] | None. | None. |

[a]The dimension of the 180 g exotherm sample is about 1" high × 3.5" diameter.
[b]The samples had cured overnight.
[c]The substrates failed. The glass fiber was torn apart.
[d]Bead size was 1.0" H × 2.1" W × 3.0" L.

Substrates which can be bonded with adhesives in accordance with the invention, include those disclosed in U.S. Pat. No. 4,714,730 and include thermoplastics, thermosets, resins, composite resins, including polyester/glass, urethane/glass, epoxy/g,lass, epoxy graphite and epoxy kevlar surfaces along with steel, other metal, primed and unprimed surfaces.

Adhesives in accordance with embodiments of the invention can resist sliding and sag when applied to vertical thermoplastic and fiberglass reinforced polyester substrates. Adhesion of panels in an overhead position is possible.

Adhesives in accordance with embodiments of the invention resist boiling when applied in 1 inch beads, or greater. Adhesives in accordance with embodiments of the invention can have working times of 40 to 80 minutes at 95° F. The adhesives will also cure at relatively cool temperatures, such as 60° F. and below, though cure times will be longer.

It will thus be seen that the objects set forth above, among those made apparent from the preceding description, are efficiently attained and, since certain changes may be made in the above-compositions of matter without departing from the spirit and scope of the invention, it is intended that all matter contained in the above-description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in a singular are intended to include compatible mixtures of such ingredients wherever the sense permits.

What is claimed is:

1. A two-part adhesive composition comprising an adhesive prepared by combining an adhesive part and an activator part, wherein said adhesive part comprises acrylic and/or methacrylic monomers, reducing agents, an inhibitor, impact modifiers, and toughening agents, wherein said activator part comprises at least one initiator, and wherein said adhesive composition has a working time of approximately 40 minutes or longer at a temperature of 95° F. and said reducing agents being selected from the group consisting of (a) at least one aniline having the following formula:

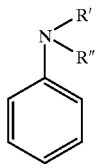

wherein R' and R" are —$CH_3$ or —$C_2H_5$ and may be same or different, (b) at least one ortho-toluidine or meta-toluidine having the following formula:

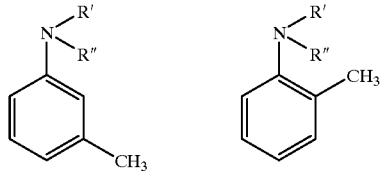

wherein for ortho-toluidines, R' and R" are only —$CH_3$, for meta-toluidines, R' and R" are —$CH_3$, or $CH_2CHY_2$, where Y is H, a weak electron-releasing group or a strong electron-withdrawing group selected from alkyl groups with $C_1$ to $C_6$, OH, CN, a halogen, $OC_nH_{2n+1}$ with n less than 4, $OOCCH_3$ and wherein R' and R" may be the same or different, (c) at least one substituted meta-aniline or substituted para-aniline having one of the following formulas:

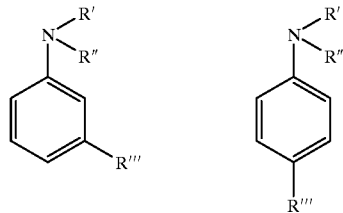

wherein R''' is a halogen, OR where R has $C_1$ to $C_6$, $COOC_nH_{2n+1}$ with n up to 10 and R' and R" are —$CH_3$ or —$C_2H_5$ and wherein R' and R" may be same or different, (d) at least one substituted meta-toluidine or substituted para-toluidine having one of the following formulas:

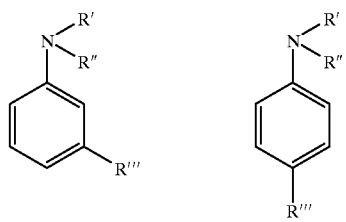

wherein R''' is CHZ'Z" or $CH_2Z'$, where Z' and/or Z" is an alkyl group with $C_1$ to $C_6$, a halogen, OH, OR where R has $C_1$ to $C_6$, $COOC_nH_{2n+1}$ with n up to 10, and the like, wherein Z' and/or Z" may be the same, and wherein R' and R" are —$CH_3$, or $CH_2CHY_2$, where Y is H, a weak electron-releasing group or a strong electron-withdrawing group selected from alkyl groups with $C_1$ to $C_6$, OH, CN, a halogen, $OC_nH_{2n+1}$ with n less than 4, $OOCCH_3$ and wherein R' and R" may be the same or different, and (e) at least one reducing agent as described in (a), (b), (c) or (d) in combination with at least one para-toluidine, said para-toluidine being in an amount up to 30 mole percent of the total amount of reducing agent in the adhesive and having the following formula:

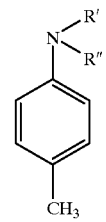

wherein R' and R" are —$CH_3$, or $CH_2CHY_2$, where Y is H, a weak electron-releasing group or a strong electron-withdrawing group selected from alkyl groups with $C_1$ to $C_6$, OH, CN, a halogen, $OC_nH_{2+1}$ with n less than 4, $OOCCH_3$ and R' and R" may be the same or different.

2. The adhesive composition of claim 1, wherein said adhesive part further comprises carboxylic acids, retarders and/or chain transfer agents, and wherein said activator part further comprises carriers, thickening agents and/or pigments.

3. The adhesive composition of claim 1 wherein said acrylic and/or methacrylic monomers are of the following general structure:

Methacrylate esters:

$$CH_2{=}C(CH_3){-}COOR \quad \text{and}$$

Acrylate esters: $CH_2{=}CH{-}COOR$, $R = C_nH_{2n+1}, n = 1, 2, 3 \ldots 20$.

and

Acrylate esters: $CH_2{=}CH{-}COOR$, where $R=C_nH_{2n+1}$, and where n=1, 2, 3, . . . 20, and wherein low molecular weight monomers are those of said monomers where $n \le 2$, and high molecular weight monomers are those of said monomers where n>2.

4. The low molecular weight monomers of claim 3 wherein n=1.

5. The high molecular weight monomers of claim 3 wherein n=10 to 18.

6. The adhesive composition of claim 3 wherein said low molecular weight monomers are present in a range of from 80 to 100 weight percent of the monomers, and wherein said high molecular weight monomers are present in a range of from 0 to 20 weight percent of the monomers.

7. The adhesive composition of claim 3 wherein said low molecular weight monomers are present in a range of from 86 to 100 weight percent of the monomers, and wherein said high molecular weight monomers are present in a range of from 0 to 14 weight percent of the monomers.

8. The adhesive composition of claim 1 wherein said adhesive part comprises said acrylate and/or methacrylate monomers in a range of about 55% to 75% by weight.

9. The adhesive composition of claim 1 wherein said adhesive part comprises acrylate and/or methacrylate monomers in a range of 58% to 68% by weight.

10. The adhesive composition of claim 1 wherein said adhesive part comprises acrylate and/or methacrylate monomers in a range of 60% to 65% by weight.

11. The adhesive composition of claim 1, wherein said reducing agent comprises at least one aniline having the following formula:

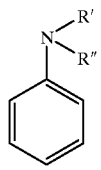

wherein R' and R" are —CH$_3$ or —C$_2$H$_5$ and may be same or different.

12. The adhesive composition of claim 1, wherein said reducing agent comprises at least one ortho-toluidine or meta-toluidine having the following formulas:

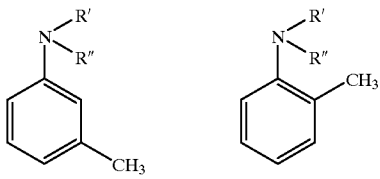

wherein for ortho-toluidines, R' and R" are only —CH$_3$, for meta-toluidines, R' and R" are —CH$_3$, or CH$_2$CHY$_2$, where Y is H, a weak electron-releasing group or a strong electron-withdrawing group selected from alkyl groups with C$_1$ to C$_6$, OH, CN, a halogen, OC$_n$H$_{2n+1}$ with n less than 4, OOCCH$_3$ and wherein R' and R" may be the same or different.

13. The adhesive composition of claim 1, wherein said reducing agent comprises at least one substituted meta-aniline or substituted para-aniline having one of the following formulas:

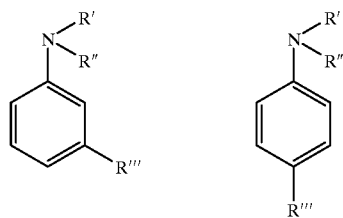

wherein R'" is a halogen, OR where R has C$_1$ to C$_6$, COOC$_n$H$_{2n+1}$ with n up to 10 and R' and R" are —CH$_3$ or —C$_2$H$_5$ and wherein R' and R" may be the same or different.

14. The adhesive composition of claim 1, wherein said reducing agent comprises at least one substituted meta-toluidine or substituted para-toluidine having one of the following formulas:

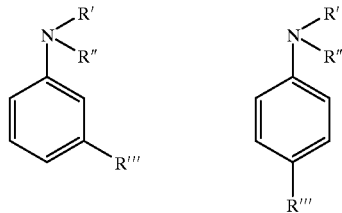

wherein R'" is CHZ'Z'" or CH$_2$Z', where Z' and/or Z" is an alkyl group with C$_1$ to C$_6$, a halogen, OH, OR where R has C$_1$ to C$_6$, COOC$_n$H$_{2n+1}$ with n up to 10, and the like, wherein Z' and Z" may be the same, and wherein R' and R" are —CH$_3$, or CH$_2$CHY$_2$, where Y is H, a weak electron-releasing group or a strong electron-withdrawing group selected from alkyl groups with C$_1$ to C$_6$, OH, CN, a halogen, OC$_n$H$_{2n+1}$ with n less than 4, OOCCH$_3$ and wherein R' and R" may be the same or different.

15. The adhesive composition of claim 1, wherein said reducing agent is at least one reducing agent as described in (a), (b), (c) or (d) in combination with at least one para-toluidine, said para-toluidine being in an amount up to 30 mole percent of the total amount of reducing agent in the adhesive and having the following formula:

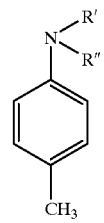

wherein R' and R" are —CH$_3$, or CH$_2$CHY$_2$, where Y is H, a weak electron-releasing group or a strong electron-withdrawing group selected from alkyl groups with C$_1$ to C$_6$, OH, CN, a halogen, OC$_n$H$_{2n+1}$ with n less than 4, OOCCH$_3$ and R' and R" may be the same or different.

16. The adhesive composition of claim 1, wherein said adhesive part comprises said reducing agent in a range of about 0.02% to about 1% by weight of adhesive part.

17. The adhesive composition of claim 1, wherein said adhesive part comprises said reducing agent in a range of 0.05% to 0.8% by weight of adhesive part.

18. The adhesive composition of claim 1, wherein said adhesive part comprises said reducing agent in a range of 0.1% to 0.4% by weight of adhesive part.

19. The adhesive composition of claim 2, wherein said adhesive part comprises toughening agents in the range of about 1% to about 20% by weight, impact modifiers in the range of about 18% to about 38% by weight, carboxylic acids in a range of 0% to about 10% by weight, and wherein said carboxylic acids can be one or more carboxylic acids, inhibitors in the range of about 0.001% to about 0.15% by weight, retarders in the range of about 0.001% to about 15% by weight and chain transfer agents in the range of 0% to about 1% by weight.

20. The adhesive composition of claim 2, wherein said adhesive part comprises toughening agents in the range of 2% to 16% by weight, impact modifiers in the range of 24% to 34% by weight, carboxylic acids in a range of 0.5% to 6% by weight, and wherein said carboxylic acids can be one or more said carboxylic, inhibitors in the range of 0.005% to 0.1% by weight, retarders in the range of 0.005% to 0.1% by weight, and chain transfer agents in the range of 0.2% to 0.8% by weight.

21. The adhesive composition of claim 2, wherein said adhesive part comprises said toughening agents in the range of 3% to 10% by weight, impact modifiers in the range of 28% to 32% by weight, carboxylic acids in a range of 1% to 3% by weight, and wherein said carboxylic acids can be one or more said carboxylic acids, inhibitors in the range of 0.01% to 0.08% by weight, retarders in the range of about 0.01% to about 0.08% by weight, and chain transfer agents in the range of 0.4% to 0.6% by weight.

22. The adhesive composition of claim 2 wherein said carboxylic acids are comprised of methacrylic acid.

23. The adhesive composition of claim 1, wherein said toughening agents are comprised of synthetic polymers selected from the group consisting of polychloroprene, copolymers of butadiene with other monomers such as acrylonitrile, copolymers of isoprene with styrene, acrylonitrile, acrylate esters, methacrylate esters, copolymers of ethylene and acrylate esters, homopolymers of epichlorohydrin and copolymers of epichlorohydrin and ethylene.

24. The adhesive composition of claim 1, wherein said toughening agents are comprised of polymers selected from the group consisting of polychloroprene with block copolymers of styrene and butadiene or isoprene, and block copolymers of styrene and diene monomers.

25. The adhesive composition of claim 1, wherein said impact modifiers are core-shell graft copolymers.

26. The adhesive composition of claim 1, wherein the activator part includes an initiator comprising free radical generators, including those selected from the group consisting of dibenzoyl peroxide, cumene hydroperoxide, tertiary butyl hydroperoxide, dicumyl peroxide, tertiary butyl peroxide acetate, tertiary butyl perbonzoate, ditertiary butyl azodiisobutyronotrile.

27. The adhesive composition of claim 1, wherein said initiator is dibenzoyl peroxide.

28. The adhesive composition of claim 1, wherein the mole ratio of said initiators to said reducing agents is in the range of 2.2 to 10.

29. The adhesive composition of claim 1, wherein the mole ratio of said initiators to said reducing agents is in the range of 3.3 to 5.

30. The adhesive composition of claim 1, wherein the volume ratio of the adhesive part to the activator part is from 7:1 to 15:1.

31. The adhesive composition of claim 1, wherein the volume ratio of the adhesive part to the activator part is from 10:1.

32. The adhesive composition of claim 1, wherein the effective working times are approximately 40 to 80 minutes at 95° F.

33. The adhesive composition of claim 1, which does not boil during curing for a bead size of up to approximately 1 inch.

34. The adhesive composition of claim 1, wherein said reducing agent is a combination of (a) at least one ortho-toluidine or meta-toluidine having the following formulas:

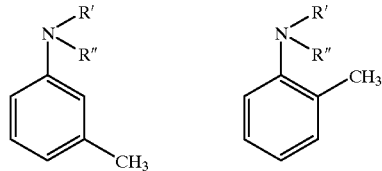

wherein for ortho-toluidines, R' and R" are only —$CH_3$, for meta-toluidines, R' and R" are —$CH_3$, or $CH_2CHY_2$, where Y is H, a weak electron-releasing group or a strong electron-withdrawing group selected from alkyl groups with $C_1$ to $C_6$, OH, CN, a halogen, $OC_nH_{2n+1}$ with n less than 4, $OOCCH_3$ and wherein R' and R" may be the same or different, and (b) at least one para-toluidine, in an amount up to 30 mole percent of the total amount of reducing agent in the adhesive, said para-toluidine having the following formula:

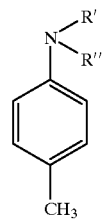

wherein R' and R" are —$CH_3$, or $CH_2CHY_2$, where Y is H, a weak electron-releasing group or a strong electron-withdrawing group selected from alkyl groups with $C_1$ to $C_6$, OH, CN, a halogen, $OC_nH_{2n+1}$ with n less than 4, $OOCCH_3$ and R' and R" may be the same or different.

35. The adhesive composition of claim 1, wherein said adhesive composition exhibits resistance to sliding.

36. The adhesive composition of claim 1, wherein said adhesive composition does not boil during curing.

* * * * *

UNITED STATES PATENT AND TRADEMARK OFFICE
CERTIFICATE OF CORRECTION

PATENT NO. : 6,512,043 B2
DATED : January 28, 2003
INVENTOR(S) : Wang et al.

It is certified that error appears in the above-identified patent and that said Letters Patent is hereby corrected as shown below:

<u>Title page,</u>
Item [75], inventors, please change the address of the first inventor to read as follows:
-- [75]  Inventors: Xiaobin Wang, North Andover, MA (US);
            Donald Gosiewski, Peabody, MA (US) --

Signed and Sealed this

Seventeenth Day of June, 2003

JAMES E. ROGAN
*Director of the United States Patent and Trademark Office*